(12) United States Patent
Brown

(10) Patent No.: US 10,188,933 B2
(45) Date of Patent: Jan. 29, 2019

(54) METHOD AND SYSTEM FOR DETERMINING BALL POSITIONS AND FIRST DOWNS IN A FOOTBALL GAME

(71) Applicant: Jeb Brown, Denver, CO (US)

(72) Inventor: Jeb Brown, Denver, CO (US)

(*) Notice: Subject to any disclaimer, the term of this patent is extended or adjusted under 35 U.S.C. 154(b) by 0 days.

(21) Appl. No.: 15/620,058

(22) Filed: Jun. 12, 2017

(65) Prior Publication Data
US 2017/0326432 A1 Nov. 16, 2017

Related U.S. Application Data

(63) Continuation of application No. 15/244,236, filed on Aug. 23, 2016, now Pat. No. 9,675,865, which is a continuation of application No. 15/058,339, filed on Mar. 2, 2016, now Pat. No. 9,433,849.

(51) Int. Cl.
| | | |
|---|---|---|
| *A63B 71/06* | (2006.01) | |
| *A43B 3/00* | (2006.01) | |
| *A63B 24/00* | (2006.01) | |
| *G01C 15/00* | (2006.01) | |

(52) U.S. Cl.
CPC ........ *A63B 71/0619* (2013.01); *A43B 3/0005* (2013.01); *A63B 24/0021* (2013.01); *A63B 71/0605* (2013.01); *G01C 15/004* (2013.01); *A43B 3/00* (2013.01); *A63B 2024/0053* (2013.01); *A63B 2071/0694* (2013.01); *A63B 2207/02* (2013.01); *A63B 2243/007* (2013.01); *G01C 15/00* (2013.01)

(58) Field of Classification Search
CPC .. G01C 15/00; G01C 15/004; A63B 71/0605; A63B 2243/007; A63B 24/0021; A63B 2024/0053; A63B 2071/0694; A63B 2207/02; A43B 3/0005; A43B 3/00
USPC .... 33/227–228, 263–264, 286, 289, DIG. 21
See application file for complete search history.

(56) References Cited

U.S. PATENT DOCUMENTS

| | | | | | |
|---|---|---|---|---|---|
| 2,520,031 | A | * | 8/1950 | Darr | A63B 71/06 33/289 |
| 3,300,861 | A | * | 1/1967 | Lilly | A63B 71/0605 33/276 |
| 3,608,199 | A | * | 9/1971 | Hunt | G01B 3/02 33/289 |
| 3,741,662 | A | * | 6/1973 | Pioch | A63B 71/06 33/289 |
| 3,752,588 | A | * | 8/1973 | Chapman | A63B 71/06 33/289 |
| 3,985,356 | A | * | 10/1976 | Carlock | A63B 71/0605 33/289 |
| 4,090,708 | A | * | 5/1978 | McPeak | A63C 19/08 33/289 |

(Continued)

*Primary Examiner* — R. A. Smith
*Assistant Examiner* — Tania Courson
(74) *Attorney, Agent, or Firm* — Sheridan Ross P.C.

(57) ABSTRACT

A method and system for use in the game of football to determine ball placement and position, as well as first down demarcations, is described, with various embodiments configured to track the location of a football to determine its position on the field and to determine and display the first down demarcation on the field. Certain embodiments employ software to assist in performing placement determinations, distance determinations, track movement of the ball, first down markers, as well as light emitting modules along a track that extends parallel to the field.

12 Claims, 10 Drawing Sheets

(56) References Cited

U.S. PATENT DOCUMENTS

| | | | | |
|---|---|---|---|---|
| 5,214,491 | A * | 5/1993 | Snowden | A63B 71/0605 33/289 |
| 6,592,465 | B2 * | 7/2003 | Lutz | A63B 43/06 348/208.14 |
| 6,851,198 | B1 * | 2/2005 | Harty | A63B 71/0605 33/289 |
| 6,895,677 | B2 * | 5/2005 | Dinicola | G01C 15/004 33/289 |
| 6,976,928 | B2 * | 12/2005 | Hemphill | A63B 71/06 33/289 |
| 7,091,863 | B2 * | 8/2006 | Ravet | A63B 24/0021 340/572.1 |
| 8,713,808 | B2 * | 5/2014 | Amron | A63C 19/065 33/289 |
| 2005/0083697 | A1 * | 4/2005 | Filep | F21V 21/15 362/285 |
| 2017/0189753 | A1 * | 7/2017 | Polifka | A63B 24/0021 |

* cited by examiner

METHOD AND SYSTEM FOR DETERMINING BALL POSITIONS AND FIRST DOWNS IN A FOOTBALL GAME

RELATED APPLICATIONS

This application is a continuation of U.S. patent application Ser. No. 15/244,236 filed on Aug. 23, 2016 (now U.S. Pat. No. 9,675,865, issued Jun. 13, 2017), which is a continuation of U.S. patent application Ser. No. 15/058,339 filed on Mar. 2, 2016 (now U.S. Pat. No. 9,433,849, issued Sep. 6, 2016). The entire disclosure of the prior application is considered to be part of the disclosure of the accompanying application and is hereby incorporated by reference.

FIELD

The invention relates to the field of marking distances on athletic surfaces and, more specifically, to laser apparatuses for use in projecting lines on to playing surfaces.

BACKGROUND

Throughout an average football game, the officials of the game must resort to sideline markers to establish whether the offense has advanced the ball by the required distance. Generally, a pair of poles connected by a 30-foot long chain is employed so that a first of these poles is located on the sidelines at the approximate location of the initial line of scrimmage and the second pole is moved as far forward as possible to indicate the 10 yard first down distance. Each time this measurement is made, the game must be delayed and the yard markers must be carried from the sidelines to the place on the field where the official has "spotted" the ball.

In the game of American football, progress made by the offensive team is measured by what is referred to as the "chain system." The chain system includes three main components which will be referred to as the rear rod, the forward rod, and the box. The rear rod marks the beginning of the current set of downs. The box is a pole with an indicator of the current down, and is placed at the position of the ball before each play. The forward rod marks a distance ten yards from the rear rod, in a direction towards the defense's goal-line. The forward rod and rear rod (always referred to as "sticks") are connected to one another by a chain which is exactly 10 yards in length when taut. The chain system requires 3 employees, often referred to as the "chain gang" or "chain crew," to operate. Each of the 3 employees is responsible for one of the rear rod, forward rod, and box. While the system only requires 3 employees, it is often the case that additional employees are present.

The chain system has a number of drawbacks. For example, there must be a trained chain gang, which requires costs associated with the training as well as for managing the game. Further, when attempting to determine if a player has gained a first down in a close-call situation, the chain gang is required to run out to the spot of the ball. This allows for the possibility of human error being injected into the measuring process if the chain gang does not run exactly perpendicular from where they were standing on the sideline. Moreover, there is an injury risk for both the chain gang and the players. If a player runs out of bounds near where the chain gang is positioned, he could collide with either one of the members of the chain gang or their equipment, potentially injuring the player or the chain gang. Further, if the chain gang is hit and lose their placement, it may be difficult or impossible to return to the correct placement on the field. This adds additional uncertainty into the game. Additionally, once a first down is achieved and the ball is placed on the field by the official, the placement of the rear rod is determined visually by the member of the chain gang holding the rear rod. This introduces further uncertainty and potential human error in the proper placement of the football.

While attempts at improving the chain system have been made, none have been adopted and none entirely replace the need for the chain gang entirely. For example, U.S. Pat. No. 6,751,880 entitled "System and Method for Operating Groups of Lasers to Project a Visible Line Demarcation within Discrete Regions of an Athletic Field," U.S. Pat. No. 6,796,041 entitled "System for Operating One or More Lasers to Project a Visible Line onto a Grass-Covered Surface," U.S. Pat. No. 7,219,438 entitled "System for Operating One or More Suspended Laser Projectors to Project a Temporary Visible Image onto a Surface," and U.S. Pat. No. 8,713,808 entitled "System and Method for Projecting a Visible Line on an Athletic Field Surface" are all directed to using laser projection systems to supplant the chain gang.

However, these systems have various drawbacks. For example, some of these systems require hanging bulky and potentially dangerous systems above the playing field. In the event these systems were to accidently fall, they could seriously injure a player. Further, this system is expensive. It would require the installation of support structures and wires to support the lasers. Additionally, the space above the field is already crowded, as various lines and cameras, such as the Skycam, are already present above the field. It would require substantial effort to coordinate the hanging laser systems with the already present camera systems without causing interference of either the laser system or camera system. Additionally, these systems do not alleviate the need for the chain gang. Rather, the above discussed systems merely add a new component, a laser first down marker, to the chain gang system. Moreover, none of these systems have been adopted by professional sports teams.

Still other prior art systems have been described but have never been adopted, largely for practical reasons as their implementation and function are suspect. For example, fifty years ago, U.S. Pat. No. 3,752,588 to Chapman involves the use of projectors that are located at the sidelines and several feet above the field level. The lasers are mounted for oscillation in a vertical plane and the projected, low intensity beam developed by each must strike the field at points of reference lying on an imaginary line of demarcation defined by the intersection of the vertical plane with the field surface. Accordingly, it is necessary for the operator to manually position the projector for each reference point established.

Other laser systems have been described in U.S. Pat. No. 3,741,662 to Pioch entitled "Visible Line Marker" (hereinafter "Pioch") and U.S. Pat. No. 4,090,708 to McPeak entitled "Apparatus for Marking Football Fields" (hereinafter "McPeak"), each of which are herein incorporated by reference in their entirety. The system described in Pioch requires the use of elevated rails, which increases the chances of injury to a player on the sideline. Moreover, the system described in Pioch still requires a crew of some kind to continuously move each of the laser housings on the track to the desired location. Similarly, the system described in McPeak, rather than replacing the sticks currently utilized, are merely an upgraded version of the sticks. For example, while the system does project a demarcation line for convenience, it does not improve game measurements and is not automated. Accordingly, it still requires a chain gang to operate the system on the sidelines.

Another drawback associated with the aforementioned systems is that the low-intensity output of these lasers is far too low to be visible by the players, let alone by an audience in, for example, a stadium setting. Indeed, the aforementioned systems are intended for use only in making a first down measurement determination after each close play. As it turns out, players intent on getting the ball past the first yard line—and focused on the sideline markers long enough to be "blindsided" by the defense—have suffered very serious neck and back injuries.

Television networks have recently implemented an image pre-processing system which allows viewers of televised football games to see a so-called "virtual" first down line that digitally projects, in real time, a visible line onto video frames recorded by the television camera, the line being displayed on a viewer's television set so that it appears to extend between the first down sideline markers. Unfortunately, neither the players, game officials, nor the fans attending such games can actually see this virtual line. It is thus reasonable to conclude that given the rapid and widespread adoption of a virtual visible line marking system—whose enjoyment is strictly limited to television viewers, it has heretofore been deemed impossible or impracticable to project a real, visible line onto the grassy surfaces which characterize most athletic fields.

A continuing need therefore exists for a visible line or image marking system that is simple to operate, accurate enough to allow its use by officials at sporting events, and of sufficient intensity to be viewed by players, large audiences, and television viewers alike.

A need also exists for a system capable of projecting, onto surfaces that are characterized by uniform and/or non-uniform topological features, a line which can be seen from different perspectives and from considerable distances—even in daylight conditions.

A need also exists for a system that is capable of projecting a line which, though intense enough to be seen from a wide range of viewing angles, conforms to all applicable eye-safety regulations such as those promulgated by the FDA's Center for Diagnostic and Radiological Health (CDRH).

A need also exists for a system that is flexible enough so that it can be used to project images comprising one or more linear or curvilinear line segments, with the images being either monochromatic or multicolored, as desired.

Accordingly, there exists a need for a laser system which can feasibly replace the chain system which is simpler, cheaper, and safer than the current state of the art.

SUMMARY

In view of the limitations now present in the prior art, the present invention provides a simpler, cheaper, safer, and more efficient system for measuring distances and projecting lines on to athletic surfaces using lasers.

In one embodiment, a laser projection and measuring system is provided for use in the game of football to determine ball placement and position, as well as first down demarcations. The system may include at least one track running parallel to, and the entirety of, the football field. The system may further include a first laser projection module adapted to travel along the track and a second laser module coupled, either physically, magnetically, electronically, or otherwise, to the first laser projection module for determining the position of the ball. Moreover, this embodiment provides a number of advantages over the prior art. For example, in close first-down situations where a player is tackled very close to the first down line, the determination as to whether the first down is gained is much simpler. Once the ball is placed by the officials, the laser projection module is activated. If the ball blocks the path of the laser beam, an official knows immediately that a first down was gained. If the laser beam extends across the entirety of the field, the official knows immediately that a first down was not achieved. This is because if the ball has reached the first down, it will block the path of the beam.

Various embodiments address the unique aspects of the game of football. For example, an effective ball and first down marker alignment system for the game of football must be relatively simple, sturdy, and provide a quick, readily ascertainable way to set distances. Since the ball is moved frequently, the alignment system must be capable of being quickly set up and moved to meet the requirements of the play. This is accomplished in various embodiments of the present invention due to the remote control held by a game official, preferably the referee, such that he/she can control the game by sending and receiving signals so that the movement of laser modules can be accomplished in a manner that supplants the traditional function of the chain gang and ball marker individuals. Such remote systems can be obtained and modified according to the requirements of the game and field, by, for example, employing remote control systems not dissimilar to those used with respect to remotely controlled vehicles.

In various embodiments, the laser units employed are specifically not associated with any pole marker, such as traditional chain gang poles. Instead, preferred embodiments do away with the entire chain gang and supplant those individuals and awkward equipment (which, e.g. take up valuable space on the sidelines, create opportunities for both players and officials to get hurt, etc.) and instead use lasers that are inconspicuously mounted along beveled tracks that are located within about one foot of the sidelines, while in other embodiments they may be at least one foot, and even at least two feet therefrom, so as to provide room for players when running out of bounds. The tracks extend parallel to the sidelines and are configured to shine laser light across the width of the field, to provide a visual indication of the set distance in which the ball must be moved, where the ball is, where the first down is, etc. The contact of the laser beam with the field and/or the football permits both the spectators, players and the officials to determine if the football has been moved the required distance. A power supply can be associated with the track or the individual lasers, preferably located remotely from the ends of the field so as to reduce the structures around the field, maintaining a small "footprint" with respect to machinery near the field, etc. This is in contrast to prior art systems which added to the complexity, weight, and hassle associated with including lasers and powering units on pole markers. The configuration of the track itself, preferably secured to the ground in a fashion such that a perpendicular line across the field is made possible by the shining of the laser across the field's width, insures that the laser unit will be appropriately positioned perpendicular to the sidelines of the playing field. As in a conventional football measuring system, instead of a chain and a conventional marker pole marking where the ball had previously been positioned, the use of remotely controlled laser units take the place of such bulky units and provide a safer and more accurate way to display the meaningful distances and locations as required to properly play the game of football. As one of skill in the art will appreciate, a variety of other forms of alignment using the laser beam can be utilized to insure a perpendicular placement with respect to the field of the measuring laser beam.

To compensate for the violent nature of the sport, and the commensurate degree of roughness to which the laser first down measuring device will be subjected, a special housing is integrally connected with the laser unit and provides a foam insulation, such as styrofoam, to cushion the laser unit from any violent shocks.

In other embodiments, a third laser projection module may be employed which is independent of the two connected laser modules and would serve to show the crowd or cameras the current position of the ball (i.e., it would replace the "box" component of the chain gang). In some embodiments, this third laser projection module may include a vertical holographic or laser projection device which projects a digitized version of the current downs marker used. In other embodiments, the third laser projection module may project downwardly on to the playing surface either text or a number corresponding to the current position of the ball or yards needed for a first down. In some embodiments, both projections may be utilized. In yet another embodiment, the third laser projection module is synced with the first and second laser projection modules and may project the information received from the first and second laser projection modules. In yet another embodiment, the third laser projection module may be a drone.

In another embodiment, the system includes a second track on the opposite side of the field from the first which also employs a first laser projection module and a second laser projection module. The laser projection modules on the second track are synced with the laser projection modules on the first track to ensure they are always in the same position. The second track system may act as a redundancy in the event that a player accidentally or intentionally blocks the laser. Rather than causing a break in the laser across the field, the laser projector opposite the blocked projector allows the laser to still be projected across the field.

In various embodiments, different tracks systems may be employed. For example, in one embodiment a pulley like chain system may be utilized, where approximately 200+ yards of chain is used along with two pulleys, one on each end zone. The laser projection modules are attached to the chain ten yards apart. To move the modules one direction, the pulleys rotate a first direction, and to move the modules a second direction, the pulley rotate a second direction. In other embodiments, a second, third, fourth, . . . , or nth pulley may be utilized, each pulley comprising a laser projection module. In another embodiment, the modules are equipped with wheels and attached by ten yards of chain between them. The modules can then be controlled to move locations when required. In further embodiments, the track system may be flexible and stowable. For example, the track system may be designed to roll, such that it could be rolled out for a game, and then rolled-up for storage after the game. In another embodiment, the track system and pulley system may be protected by a cover, such as that disclosed in U.S. Pat. No. 7,394,025 or U.S. Pat. No. 7,145,079, which may be further modified to include a central slit to allow the modules to move parallel to the playing surface. In other embodiments, the laser projection modules may be attached to remote controlled vehicles capable of traversing the playing field independent of the other laser projection modules and independent of a track or pulley.

In another embodiment, the laser projection module may include any commercially available laser. In another embodiment, the laser projection module may utilize a laser which projects red, green, blue, purple, orange, or yellow light. In yet another embodiment, the laser projection module may employ a laser which is capable of changing colors based on the needs of the user. For example, the laser could remain red unless and until a player crossed it, at which time it would turn green. In another embodiment, the laser projection module may utilize a plurality of lasers each with a different colored output. These lasers could each project at a different vertical and horizontal location or, by contrast, the lasers could be movable such that the projecting laser always projects from the same vertical and horizontal position.

In another embodiment, the laser projection module may include a top projector which projects a laser or light upward to provide an added visual cue for locating the first down line. In another embodiment, the laser projection module may incorporate a holographic projector which projects various objects to act as visual cues. For example, it is envisioned that in one embodiment, the "standard" first down pole marker could be recreated as a hologram. This would allow for all the visual benefits of utilizing the pole marker, without the added danger of a player colliding with either the pole or the employees tasked with managing the pole.

In yet another embodiment, the laser projection system may be autonomous. In this embodiment, the placement determinations, distance determinations, and movement of each of the modules along the track are done via software.

In another embodiment of the present invention, the laser projection system is remote operated. In this embodiment, the movement of the laser projection modules is determined by a third party present at the athletic event.

In yet another embodiment, the system incorporates cameras directly above each of the lasers. In some embodiments, the cameras allow a third party official to determine when the laser is at a specific spot on the field. For example, in an embodiment when the spot of the modules is determined by a break in the laser due to the ball blocking the beam, the camera could provide further video evidence to a third party that the module is in the correct position.

In another embodiment, the football may include a reflective or reactive element which further aids the laser in determining the appropriate placement of the ball. For example, the ball could include a small mirror which the laser may bounce off of to indicate the correct position. Alternatively, the ball could include a reactive material on the tip of the ball. When the laser is in contact with this material, it may signal to the system that it is in the correct spot. The signal to the system could be a light, a sound, or any other means which would indicate that the ball is in the correct spot.

Certain embodiments are directed to a system that employs a single track on one side of the field (e.g. so as to further reduce the clutter along the other sideline), but such track is further distinguished from systems described in the prior art. For example, only one laser is employed to project a single visible beam of light to form a demarcation lines, with such laser projecting across the field from a height considerably below any prior art system, such as the vertical support poles of McPeak or the plurality of guide rails and "higher guide rails" of Pioch are avoided, as they themselves present safety hazards. Preferably, the laser units of the present invention are not slidable along any guide rail, but rather, are reversibly connected to an elongated member, such as an extent of high tension wire, fishing line, chain, etc. that is lightweight, flexible and that is configured so that individual laser units can be connected thereto in a manner such that when the elongated member is moved, the laser unit is conveyed to a desired position along the track through which the elongated member is guided. In preferred embodiments, the elongated member is not itself electrically conductive and thus, does not carry power to the laser units. In certain embodiments, the laser units themselves are powered with lithium or other suitable batteries so as to eliminate the need for expensive and complex power systems to operate the system. The pulleys positioned at least at the ends of the elongated member(s), e.g. at the respective end zones of the football field, are powered so as to facilitate the remote control held by a game official, thus providing a way to move the elongated member, and hence the associated lasers connected thereto, to accomplish the line demarcation sought to be achieved.

One will appreciate that the minimal structure of the present track and internal elongated member, as well as the end pulleys, provides for a very inexpensive and lightweight system that even high schools and colleges, let alone professional teams, may employ. In all aspects of the present invention, there is an absence of guide rails and cross-bars that are a major feature of prior art systems, which entail still further support vertical post members that require the drilling of vertical holes in the ground and the insertion of cylinders, etc. for proper installation. In preferred embodiments of the present invention, a game official has a remote control that can address various and numerous aspects of the laser unit, including the on/off nature of the laser; the angle of the laser, the movement of the laser (e.g. by remote controlling the movement of the pulley system—or alternatively a small motorized system associated with the laser unit that is similar in many respects to remotely operated toy cars, etc.) In such a manner, the referee on the field, when fitted with a shoe configured to address the signal of the laser from the sideline laser unit, can effectively control the game by personally remotely controlling the movement of the field markers to spot the ball more precisely, to measure the ten yard first down measurements, and to ensure the proper placement of the ball, especially when the referee has access to Google Glass images so that he can personally coordinate replays with proper ball position.

In another embodiment, a sensor or reflective element may be placed in the referee's shoes for determining placement of the ball. For example, the laser modules may be synced up to the sensor in the toe or heel of the shoe. When the referee places the ball, the referee may place the tip of his shoe in line with the nose of the ball. The referee may then use a remote which sends a signal to the laser projection system instructing it to move to the spot of the sensor. In another embodiment, the referee uses the sensor to control the placement of either the laser modules acting as the "sticks" or the laser module acting as the "box." In some embodiments, the movement of the modules to the location of the sensor is automated.

In yet another embodiment, the modules may be retractable into the track system. This further improves the safety of the system by retracting the modules anytime a player was near the system, thereby reducing the chances of the player tripping and falling. In some embodiments, the modules may include sensors which notify them if a player is within a certain distance of the module, which may cause the module to retract down into the track system. In some embodiments, the track system may be substantially level with the playing surface and have guards to prevent players from stepping into the track and injuring themselves.

In yet another embodiment of the present invention, the cable extending between the two modules may be rigid. In some embodiments, the rigid cable may include a laser projection system capable of displaying numbers or text in the ten-yard distance between the two modules. This allows, for example, for the projection of the current down and current position of the ball onto the grass in a large enough font for the crowd or cameras to read.

To further comply with the written description and enablement requirements, the following patents and patent publications are also incorporated herein by this reference in their entireties: U.S. Pat. No. 6,751,880, U.S. Pat. No. 6,796,041 U.S. Pat. No. 7,219,438, U.S. Pat. No. 8,713,808, U.S. Pat. No. 8,209,874, U.S. Pat. No. 6,163,969, U.S. Pat. No. 6,754,969, U.S. Pat. No. 6,829,834, U.S. Pat. No. 6,834,435, U.S. Pat. No. 6,914,930, U.S. Pat. No. 6,964,106, U.S. Pat. No. 7,031,367, U.S. Pat. No. 7,181,853, U.S. Pat. No. 7,287,336, US 2005/0155238, US 2005/0283987, U.S. 2006/0059699, US 2007/0271800, U.S. Pat. No. 6,732,439, U.S. Pat. No. 5,137,073, US 2011/0036517, U.S. Pat. No. 8,839,841, WO 2004/038161, U.S. Pat. No. 7,394,025, U.S. Pat. No. 7,145,079, US 2010/0276888, U.S. Pat. No. 7,181,855, U.S. Pat. No. 7,086,163, U.S. Pat. No. 6,735,879, and U.S. Pat. No. 7,797,844; U.S. Pat. No. 3,741,662; U.S. Pat. No. 3,752,588; U.S. Pat. Nos. 4,090,708, 8,013,550 to Young; U.S. Pat. No. 8,442,661 to Blackwell, et. al.; WO 2014147455 to Minkovitch; US 20130002724 to Heinrich; and U.S. Pat. No. 8,220,170 to Winckler et al.

One will appreciate that this summary of the invention is not intended to be all encompassing and that the scope of the invention nor its various embodiments, let alone the most important ones, are necessarily encompassed by the above description. One of skill in the art will appreciate that the entire disclosure, as well as the incorporated references, pictures, etc. will provide a basis for the scope of the present invention as it may be claimed now and in future applications.

The Figures are not necessarily to scale.

DETAILED DESCRIPTION

Figure 1:
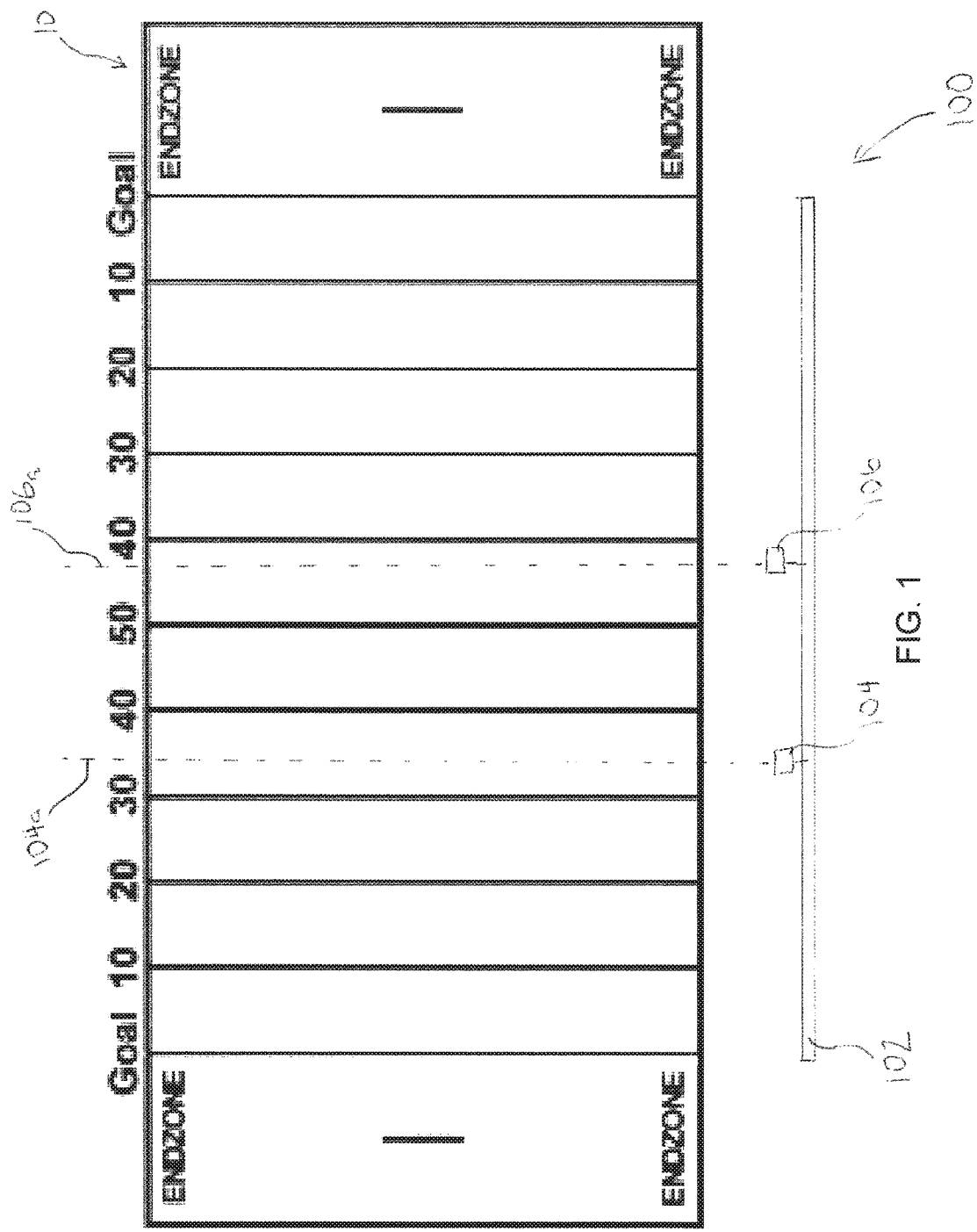
FIG. 1 shows a schematic diagram of one embodiment of the present invention.

Referring now to FIG. 1, a schematic diagram of the laser projection system 100 of the present invention is shown. The laser projection system 100 includes a track 102, a first laser projection device 104, and a second laser projection device 106. The track 102 is installed next to an athletic field 10 such that the track 102 runs parallel to and the entire length of the field 10. The first laser projection device 104 projects a first laser beam 104a perpendicularly across the field, while the second laser projection device 106 projects a second laser beam 106a perpendicularly across the field. The first laser projection device 104 and the second laser projection device are coupled together such that they remain separated by a distance of ten yards. Accordingly, the first laser beam 104a and the second laser beam 106a are likewise separated by a distance of ten yards.

Figure 2:
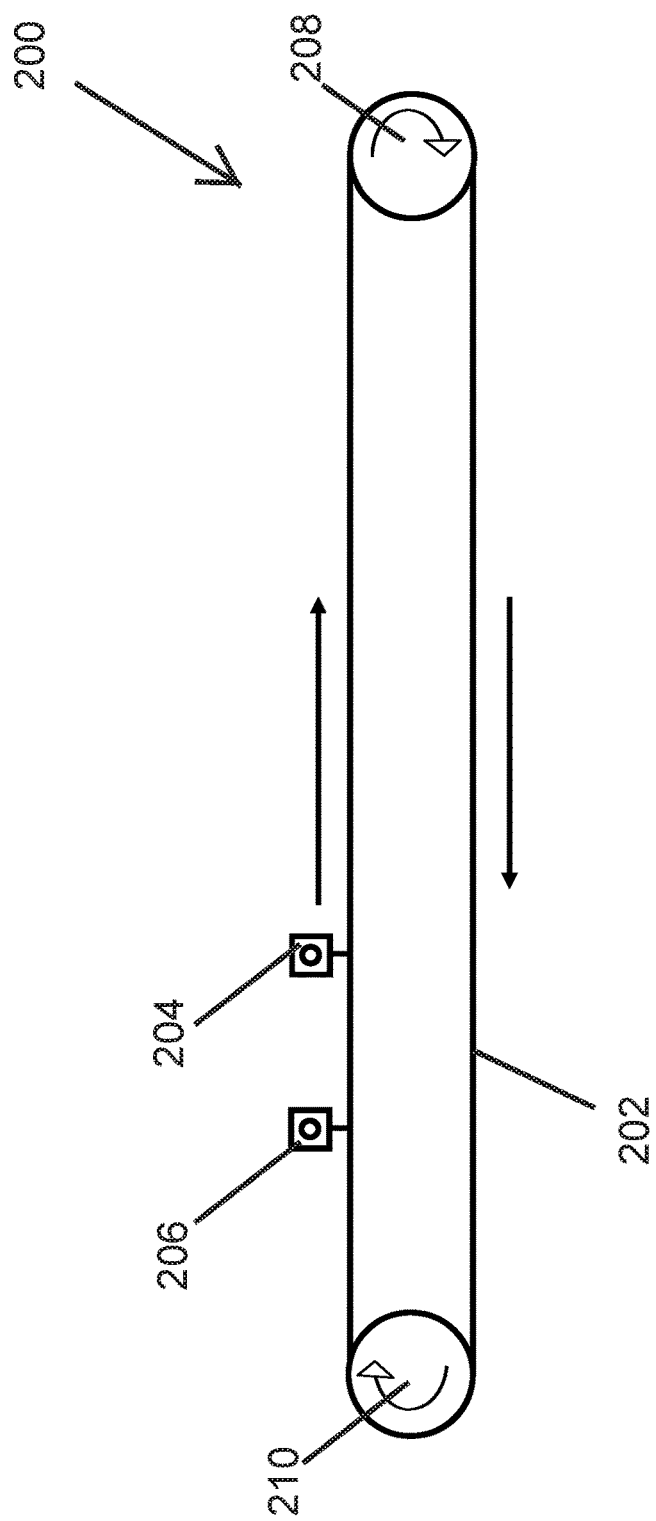
FIG. 2 shows a side view of one embodiment of the laser projection system.

FIG. 2 shows one embodiment of the laser projection system 200 in which a pulley system is utilized. As shown, a first laser module 204 and a second laser module 206 are mounted on a cable 202 and are separated by a distance of ten yards. The cable 202 itself may be at least 200 yards in order to extend the entire length of the football field. The system 200 includes a first pulley 208 and a second pulley 210, with each pulley 208, 210 being placed at each end of the football field. The pulleys 208, 210 may be mechanized such that their rotation may be controlled by a remote, or automatically by software. The modules 204, 206 may then travel parallel to the playing field by rotating the pulleys 208, 210 in a first and second direction.

Figure 3:
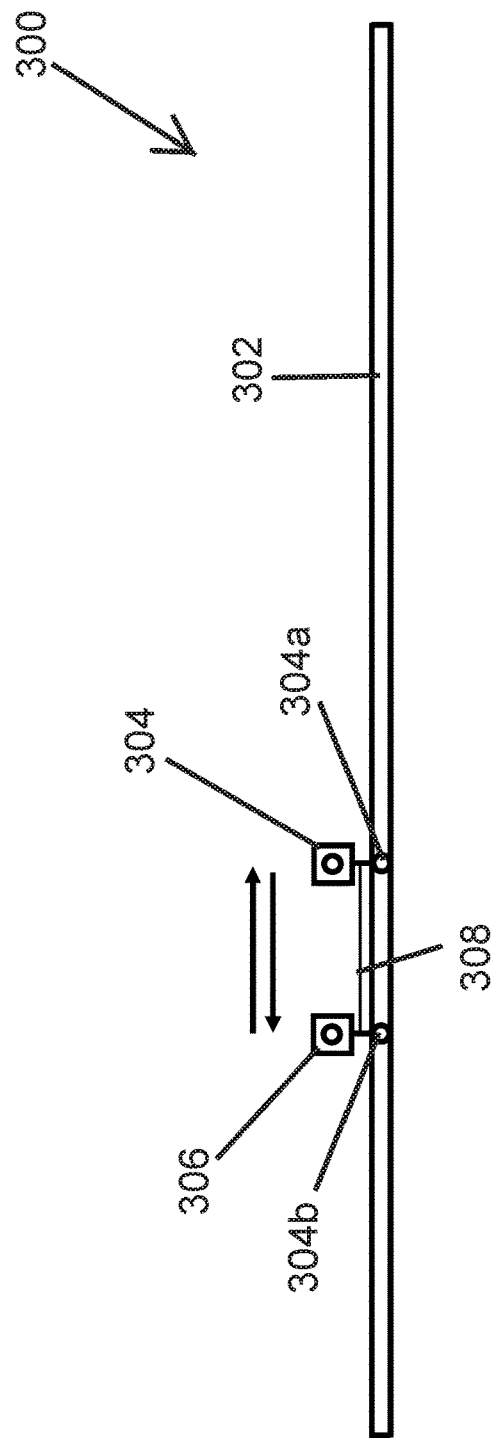
FIG. 3 shows a side view of another embodiment of the laser projection system.

FIG. 3 shows another embodiment of the laser projection system 300 in which a track system is utilized. As shown, a first laser module 304 and a second laser module 306 are connected by a cable 308 with a length of ten yards such that the first laser module 304 and the second laser module 306 are separated by ten yards. The modules 304, 306 may further include wheels 304a, 306a which may be capable of mating with a track 302. The modules 304, 306 may then move back and forth along the track 302 as needed by rolling the wheels 304a, 306a along the track. The modules 304, 306 may be mechanized such that they can move along the track 302 via remote control or by using software.

Figure 4:
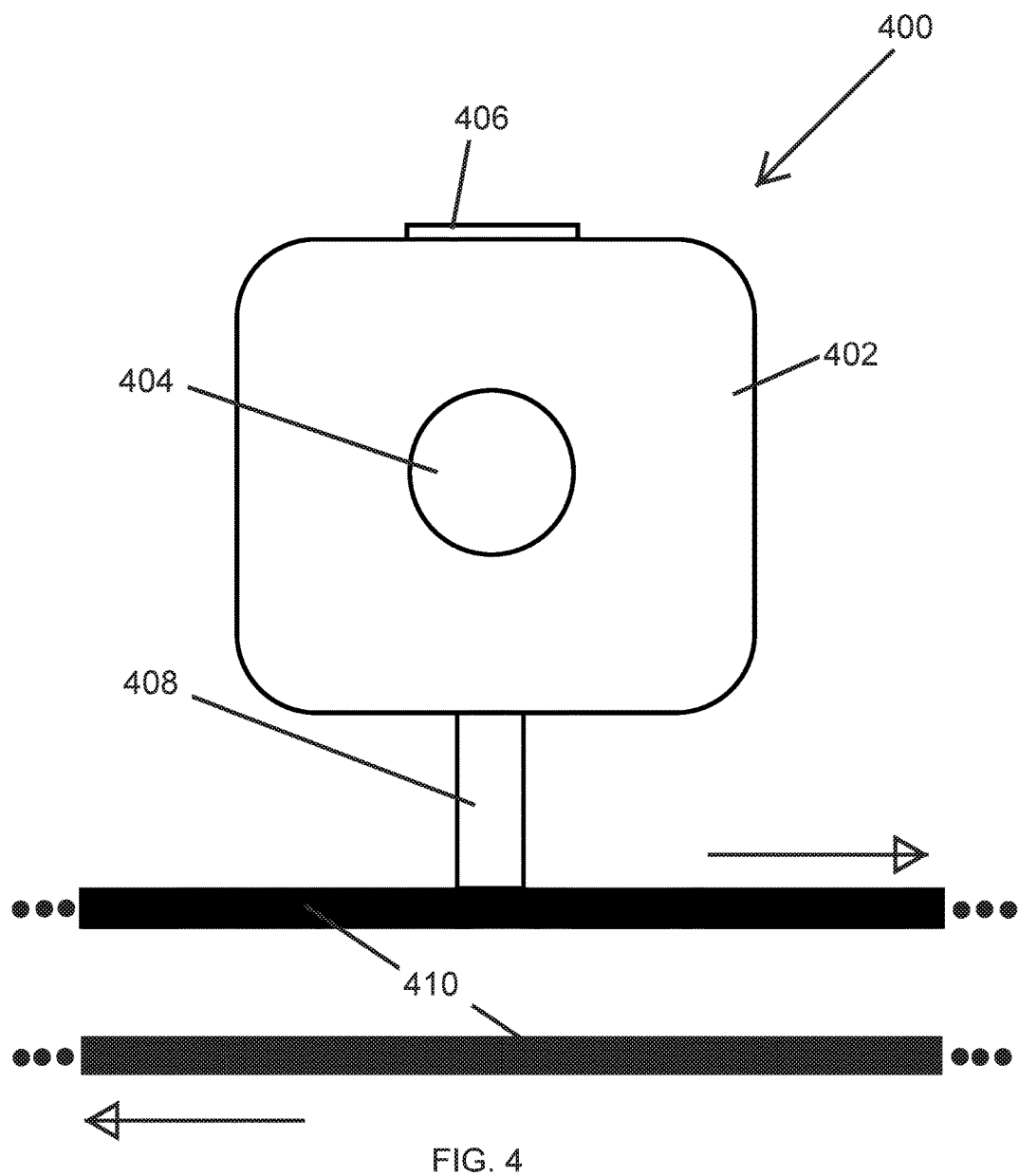
FIG. 4 shows a laser projection module according to one embodiment of the present invention.

FIG. 4 shows an embodiment of a laser projection module 400 which may be utilized with the pulley system embodiment shown in FIG. 2. As shown, the module 400 may include a laser projector 402 including a horizontal aperture 404, vertical aperture 406, and a support 408. The module 400 is connected to a pulley 410 via the support 408. As the pulley 410 rotates, the module 400 is moved along the sideline of the athletic surface until it reaches the desired location. Further, in the embodiment in which a first and second laser projection module are utilized, the modules are attached to the pulley 410 such that they are separated by a distance of ten yards.

Figure 5:
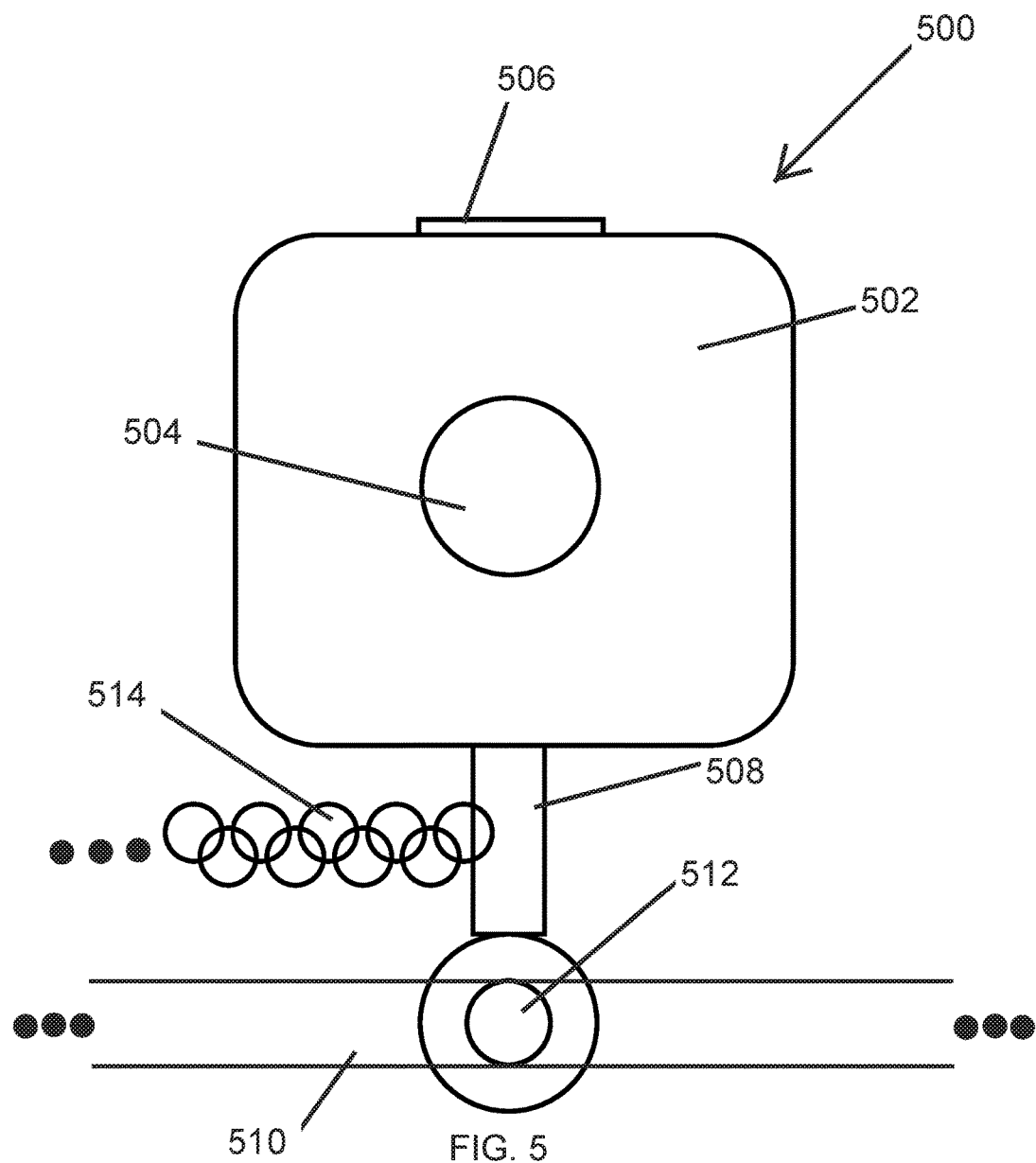
FIG. 5 shows a laser projection module according to another embodiment of the present invention.

FIG. 5 shows an embodiment of a laser projection module 500 which may be utilized with the track system embodiment shown in FIG. 3. As shown, the module 500 may include a laser projector 502 including a horizontal aperture 504, vertical aperture 506, and a support 508. The module 500 is connected to a track 510 via the support 508. More specifically, a wheel 512 is attached to the support 508 which mates with track 510 and allows the module 500 to move along the sideline of the athletic surface until it reaches the desired location. The support 508 may further include a connector 514, which may be in the form of a cable, chain, rope, etc. The connector 514 serves to connect the first laser projection module 500 with the second laser projection module, placed ten yards away from the first laser projection module.

Figure 6:
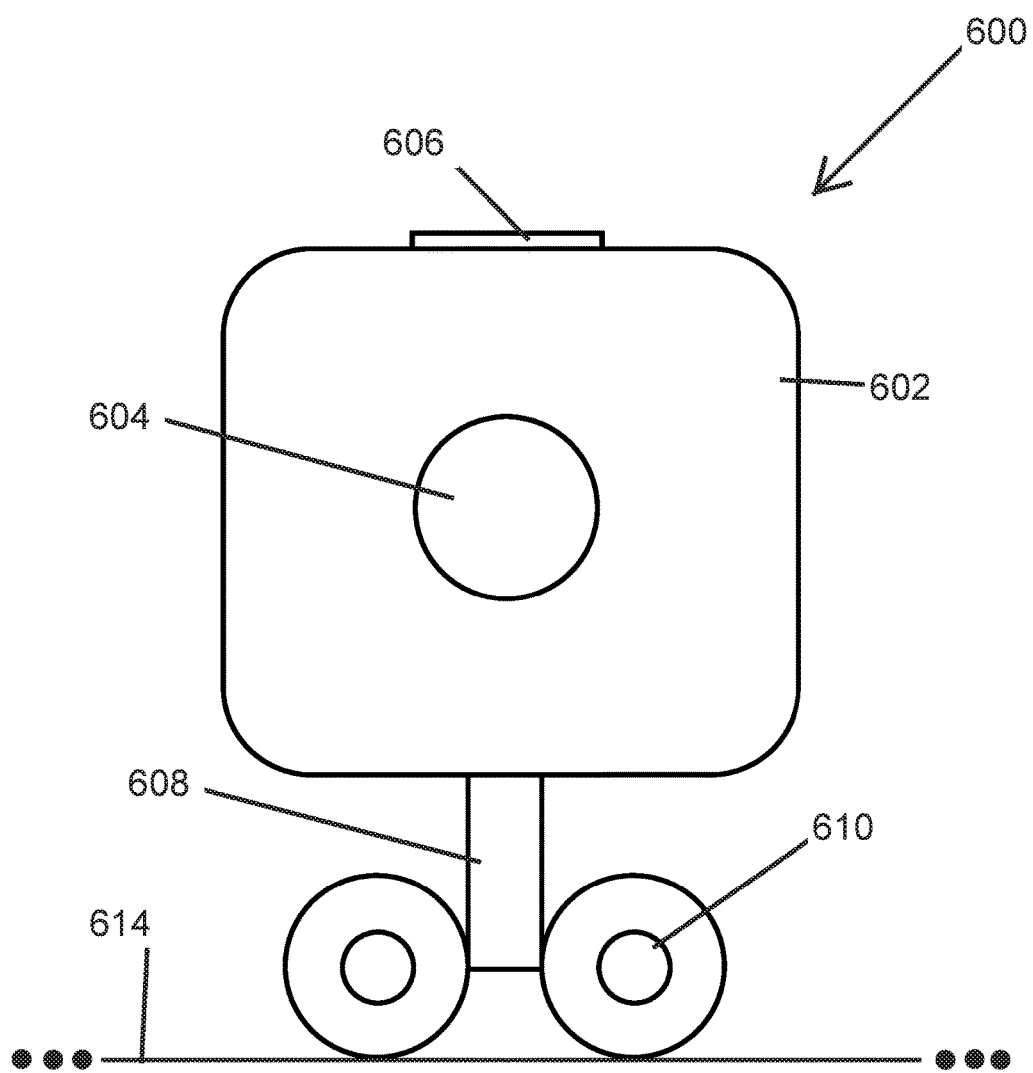
FIG. 6 shows a laser projection module according to another embodiment of the present invention.

FIG. 6 shows an embodiment of a laser projection module 600 which may be utilized independently. As shown, the module 600 may include a laser projector 602 including a horizontal aperture 604, vertical aperture 606, and a support 608. The module 600 is connected to a mobility apparatus 610, which may be wheels, treads, etc., via the support 608. The mobility apparatus 610 allows the independent laser projection module 600 to move along the length of the playing surface 614 as required during game play.

Figure 7:
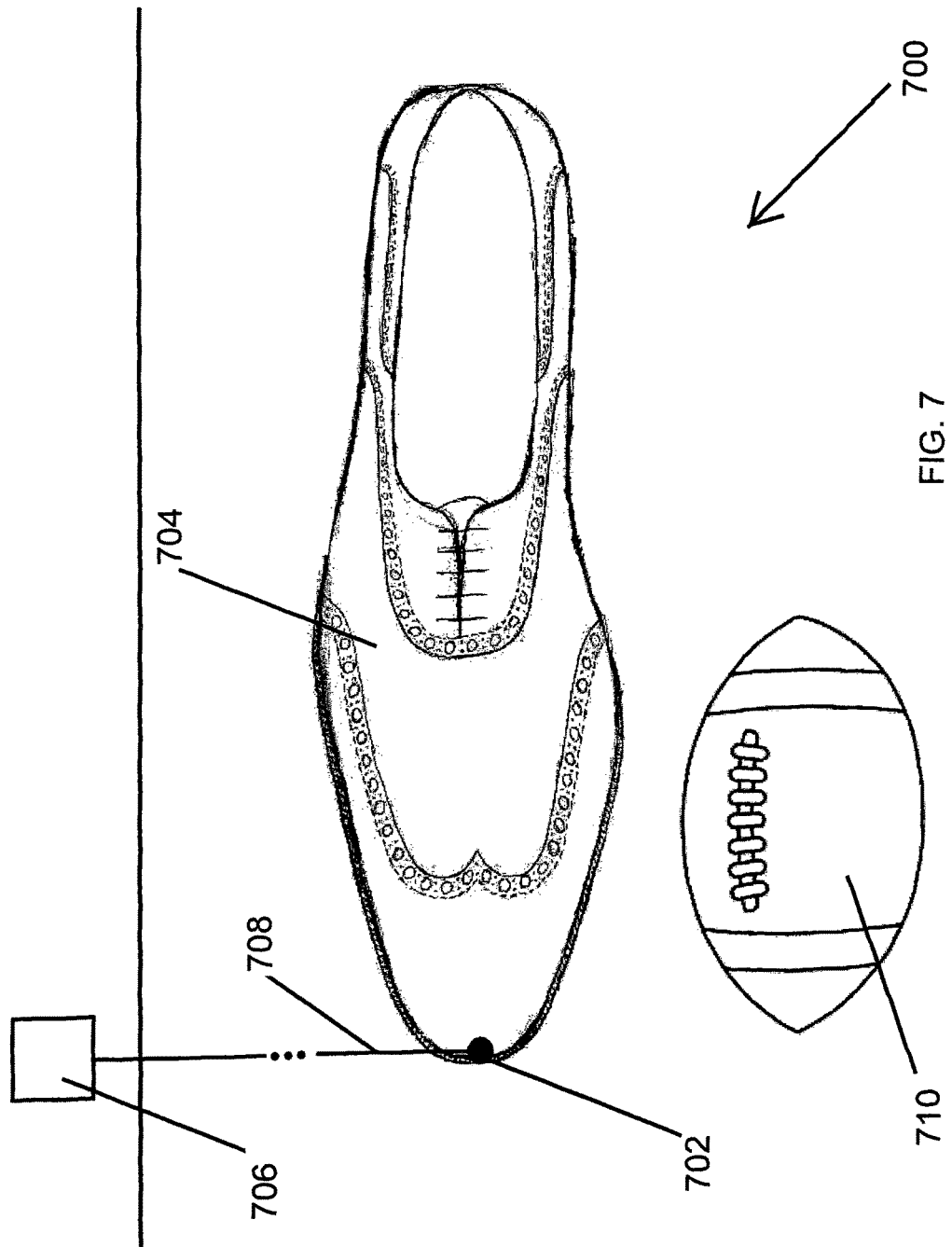
FIG. 7 shows a top view of a laser projection system incorporating a footwear sensor according to one embodiment of the present invention.

FIG. 7 shows an embodiment of the present invention incorporating a footwear sensor 700 which may be utilized in conjunction with the various embodiments of the laser projection system described herein. As shown, a sensor 702 may be employed in the toe of a shoe 704. The sensor is synced to the laser projection module 706 such that when the module 706 projects a beam 708, it will hit the sensor 702. This allows a referee to place the toe of his shoe 704 in line with the nose of, in this case a football 710, thereby ensuring that the sideline markers, in this case the laser projection module 706, are perfectly lined up with the proper placement of the football 710.

Figure 8:
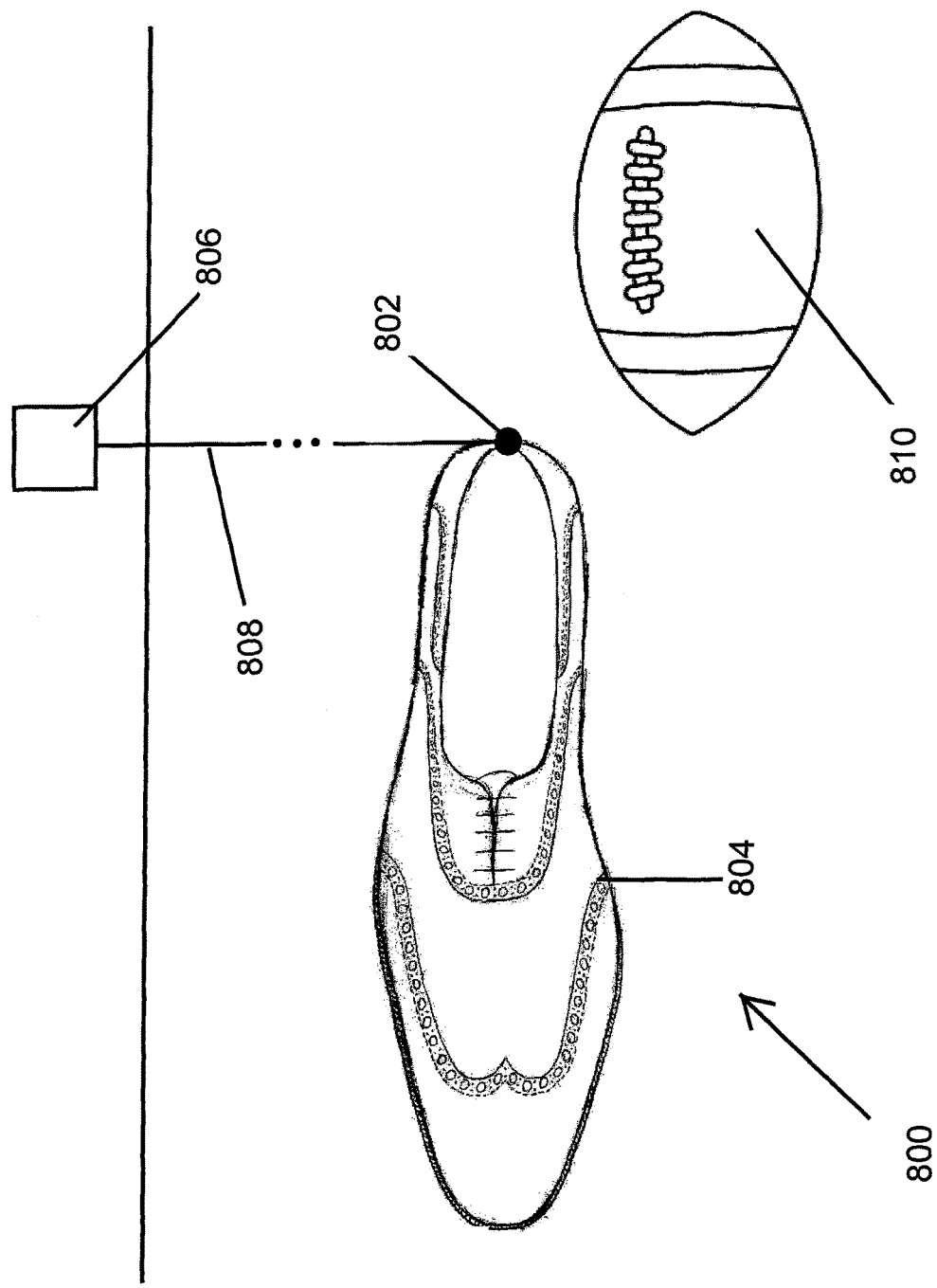
FIG. 8 shows a top view of a laser projection system incorporation a footwear sensor according to another embodiment of the present invention.

FIG. 8 shows an embodiment of the present invention incorporating a footwear sensor 800 which may be utilized in conjunction with the various embodiments of the laser projection system described herein. As shown, a sensor 8 may be employed in the heel of a shoe 804. The sensor is synced to the laser projection module 806 such that when the module 806 projects a beam 808, it will hit the sensor 802. This allows a referee to place the heel of his shoe 804 in line with the nose of, in this case a football 810, thereby ensuring that the sideline markers, in this case the laser projection module 806, are perfectly lined up with the proper placement of the football 810.

Figure 9:
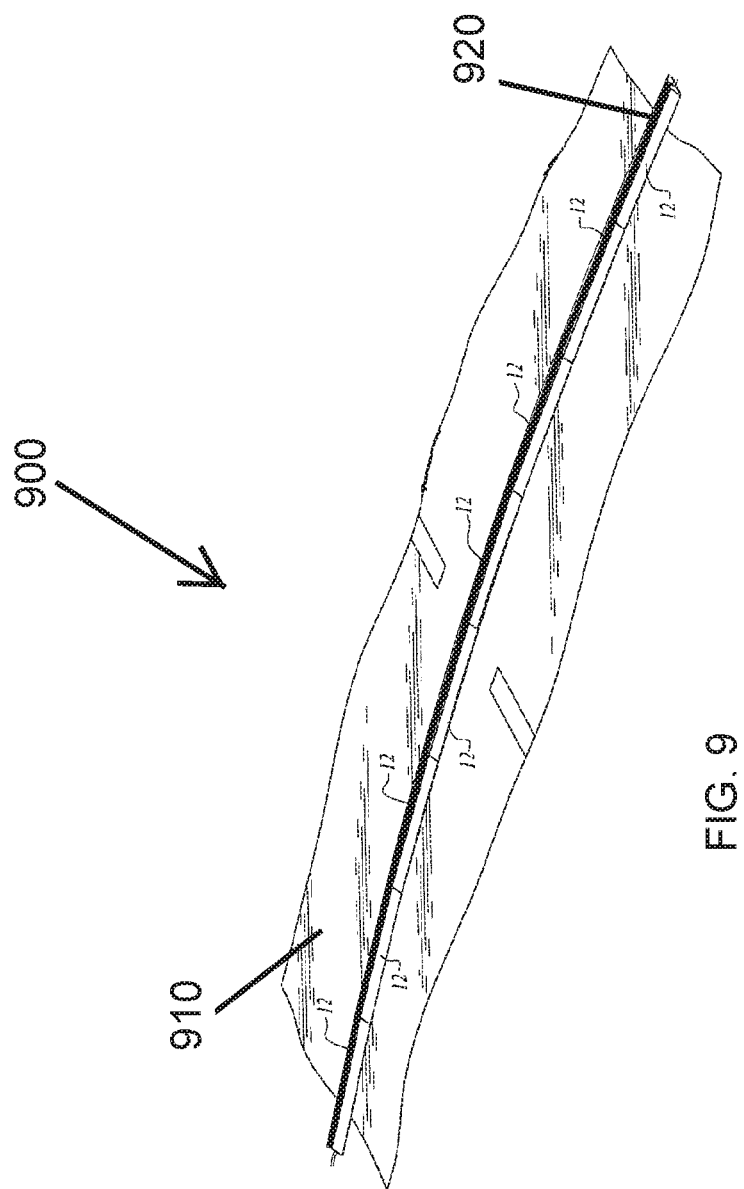
FIG. 9 shows a perspective view of an embodiment of a track which may be utilized with various embodiments of the laser projection system.

FIG. 9 shows a track system 900 for use with various embodiments of the laser projection system described herein. The system 900 includes a beveled track 12 which may be placed on the playing surface 910. The beveled track 12 may have an opening 920 which runs the length of the track 12 and allows the laser projection modules described herein to traverse the length of the track 12 unimpeded. The beveled nature of the track 12 improves the safety of the system as a whole, as it makes it more difficult for a player to trip and get injured.

Figure 10:
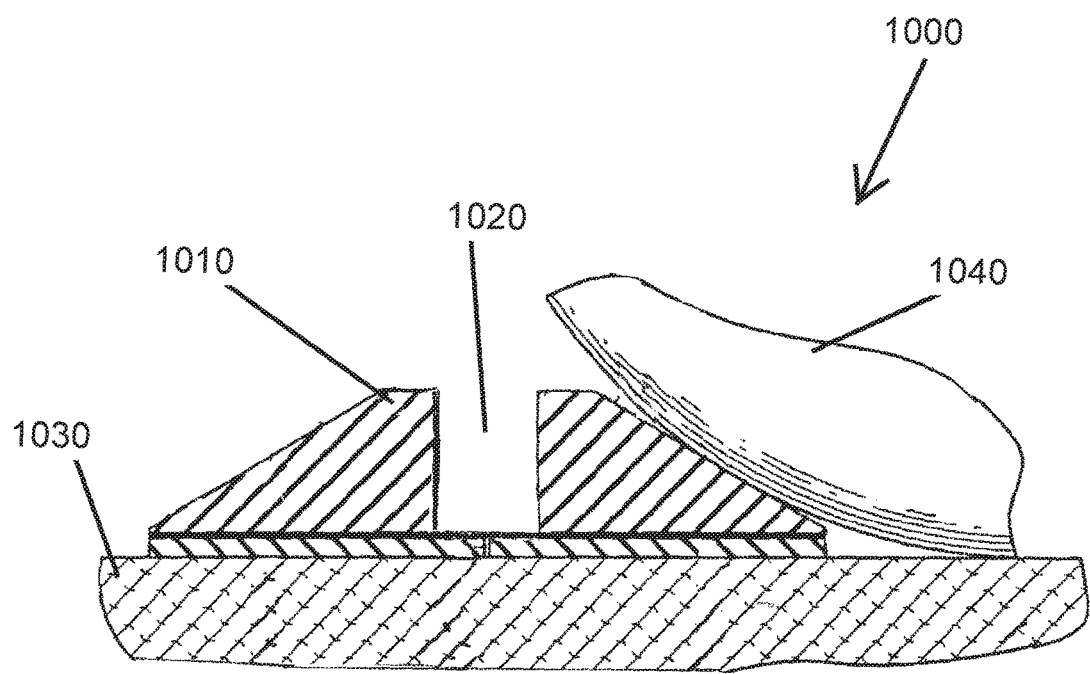
FIG. 10 shows a cross section of another embodiment of a track which may be utilized with various embodiments of the laser projection system.

FIG. 10 shows a cross-section of one embodiment of a track system 1000. As shown, the system 1000 may include a track 1010 which includes an opening 1020 which houses the laser projection systems described herein. The track 1010 is placed on the playing surface 1030 and extends the entire length of the athletic field. Moreover, the track prevents a user 1040 from injuring himself or herself while walking if they happen to step on the track 1010.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. Those skilled in the art will appreciate that the conception upon which this disclosure is based, may readily be utilized as a basis for designing of other structures, methods and systems for carrying out the several purposes of the present invention. For example, while the above description has focused on the sport of American football, one of skill in the art will appreciate that the systems and methods as described herein are applicable to various other sports, such as soccer, ice hockey, field hockey, etc. It is important, therefore, that the claims be regarded as including any such equivalent construction insofar as they do not depart from the spirit and scope of the present invention.

What is claimed is:

1. A system for determining ball placement on an athletic football field, comprising:
   a first light projection device and a second light projection device adapted to travel parallel to the athletic field within a beveled elongated track having at least one slot that extends at least 100 yards, said track being positioned parallel to one sideline on a football field; wherein said first light projection device and said second light projection device are configured to project a light on the athletic field, and wherein the first light projection device is configured to track the location of a football during first down when the football is on a line of scrimmage during play of a football game, and wherein the second light projection device is configured to track the location of a first down demarcation on the field;
   a remote control unit adapted to perform at least one of the following: turn said first light projection device on and off; adjust the angle of said first light projecting device; and effect the movement of said first light projection device;
   wherein at least one of the first light projection device and the second light projection device have a camera mounted thereto;
   wherein the first light projection device is adapted to project a light beam in a horizontal direction across a width of the athletic field;
   a location sensor possessed by a referee, that communicates the location of the football; and wherein the referee sends a signal to the at least one of the first light projection device and the second light projection device, instructing said at least one of the first light projection device and the second light projection device to move into alignment with said location sensor;
   wherein said first light projection device is associated with a first elongated member that extends along the length of a side-line of the field between a first end zone to a second end zone, said elongated member associated with a first pulley and a second pulley.

2. The system of claim 1, wherein at least the first light projection device is adapted to project one of a colored light, a hologram, and an image.

3. The system of claim 1, wherein the first light projection module is magnetically or electronically coupled to the second light projection module.

4. The system of claim 1, wherein the remote control unit instructs the location sensor to communicate the location of the football to the first light projection device.

5. The system of claim 1, wherein the location sensor is located in a shoe worn by a referee.

6. The system of claim 1, wherein the remote control unit is operated by a referee.

7. The system of claim 1, wherein a power supply is associated with the track.

8. The system of claim 1, wherein the first light projection unit is housed inside a housing having a cushion layer to protect the first light from violent shocks.

9. The system of claim 1, further comprising a second track on the opposite sideline of the athletic field that employs a third projection device.

10. The system of claim 1, wherein the track is flexible.

11. The system according to claim 1, wherein the second light projection module is associated with an elongated member.

12. The system according to claim 1, wherein the first light projection module and the second light projection module are attached to a first elongated member and wherein the first elongated member comprises a cable.

* * * * *